UNITED STATES PATENT OFFICE.

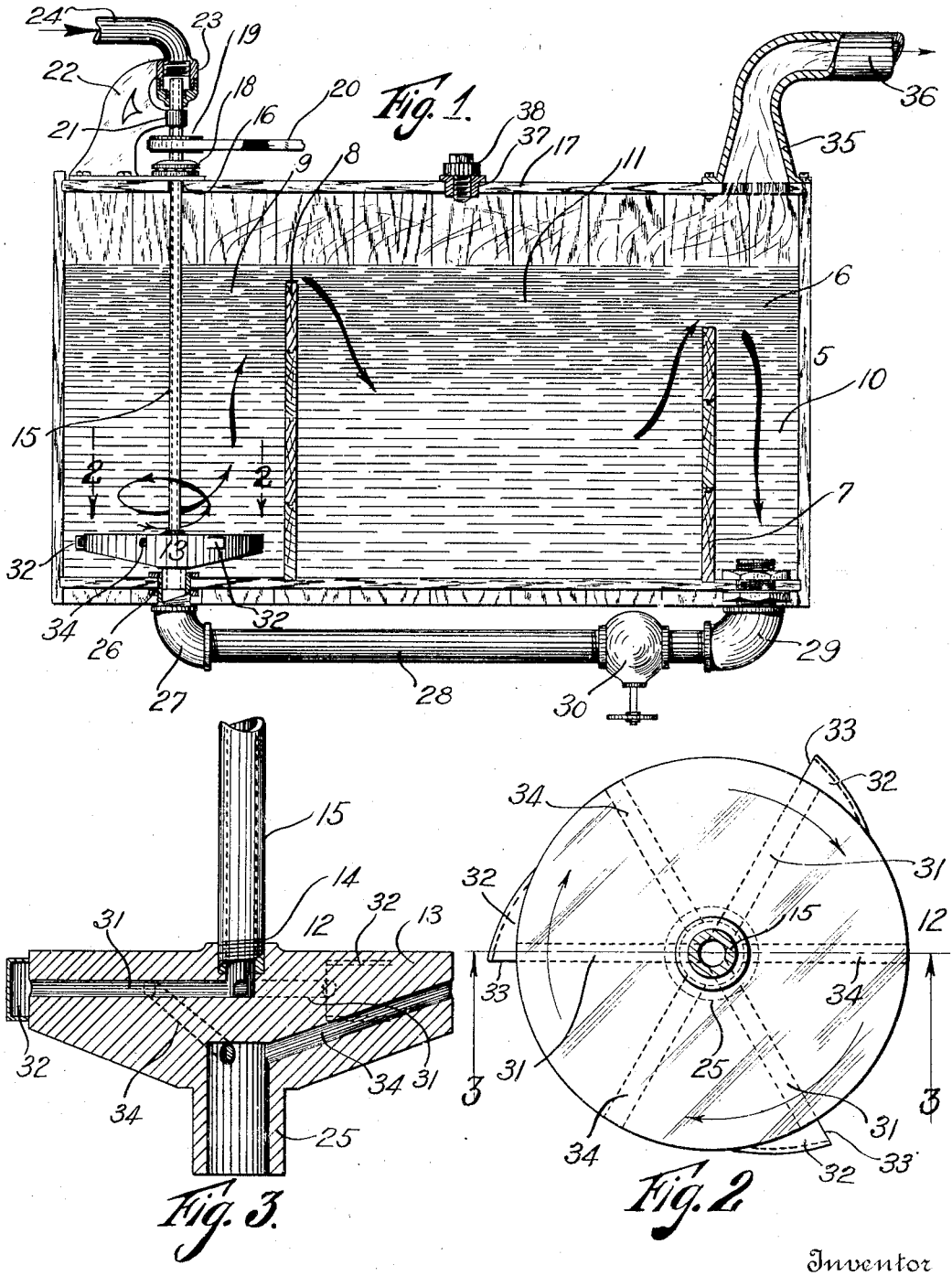

JOSEPH P. RUTH, JR., OF DENVER, COLORADO.

GAS WASHING AND HUMIDIFYING PROCESS.

1,365,278.

Specification of Letters Patent.

Patented Jan. 11, 1921.

Application filed August 16, 1917. Serial No. 186,603.

*To all whom it may concern:*

Be it known that I, JOSEPH P. RUTH, Jr., a citizen of the United States, residing at the city and county of Denver and State of Colorado, have invented certain new and useful Improvements in Gas Washing and Humidifying Processes; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a gas washing and humidifying process, my object being to provide a process for washing and humidifying gas which shall be exceedingly simple, efficient and entirely automatic, and while for the purpose of practising the process any suitable mechanical construction may be employed, I have illustrated one embodiment of such apparatus, this particular construction having been found suitable for the purpose by actual demonstration.

The process consists in drawing the gas into water by agitating the latter in such a manner as to produce a partial vacuum at the extremities of passages which are located below the water; and which are in communication with the gas to be washed, whereby the gas is drawn into the liquid and discharged under such conditions as to thoroughly mingle the gas with the liquid. An important feature of the process consists in adding to the water a small quantity of oil, or oily substance, the result being that the agitating of the water in conjunction with the oil, produces an emulsion, the gas bubbles being thoroughly broken up, whereby there is a thorough intermingling of the gas with the water, with the result that the gas is thoroughly cleansed. It is well understood that the essential feature in gas washing, consists in bringing every particle of the gas into contact with the water. In the case of coal gas, for instance, the ammonia in the gas, and which it is desired to remove therefrom for the purification of the gas, has an affinity for the water, and by virtue of the emulsification produced by the agitation of the water and the small quantity of oil employed, what otherwise would be relatively large bubbles, are broken up, thus producing an ideal condition for gas washing, since every particle of the gas is brought into intimate contact with the water. The quantity of oil employed is exceedingly small, since approximately 1% or a small fraction thereof, will answer the purpose. A tank of water of any desired size and proportions may be employed and the water may be used until it becomes thoroughly fouled with the impurities taken from the gas during the washing process, after which it may be discarded and fresh water provided.

The process may be used in connection with precipitation as obtaining calcium carbonate by passing flue gases through lime water.

Having briefly outlined the invention, I will proceed to describe the same in detail, reference being made to the accompanying drawing which, as heretofore indicated, discloses suitable apparatus for practising the process. In this drawing:

Figure 1 is a vertical section of the apparatus.

Fig. 2 is a top plan view of the agitating member looking in the direction of arrows 2, Fig. 1.

Fig. 3 is a vertical section taken through the agitating member on the line 3—3, Fig. 2, the construction being shown on a slightly larger scale.

The same reference characters indicate the same parts in all the views.

Let the numeral 5 designate a tank or receptacle adapted to hold a quantity of water 6. This tank is provided with two transverse partitions 7 and 8 which separate the tank into a number of compartments, which I will designate by the numerals 9, 10 and 11 respectively. The compartment 9 is between the partition 8 and one end of the tank, and I will term this the agitating compartment since the agitating member 12 is located therein. This agitating member, as illustrated in the drawing consists of a head 13 to the center of which is secured, as shown at 14, a vertically disposed hollow shaft 15, the upper extremity of this shaft passing through an opening 16 formed in the top 17 of the tank, the agitating member being supported at the top by a ball bearing 18, one member of which is fast on the top of the tank, while the other is fast on the hollow shaft, the bearing balls being interposed in the well known manner. Above the bearing 18 the shaft is provided with a pulley 19 which may be connected with a belt 20 which leads to a motor of any suitable type. Above the pulley the shaft is journaled, as shown at 21, in a stationary support 22 which also carries a sleeve 23 into which the upper extremity of the shaft protrudes, and with which is connected the inner extremity of a conduit 24 which is in communication with the source of the gas to be washed. The lower extremity of the agitating head 13 is provided with a depending sleeve 25 which is fitted into a stationary bearing 26 formed at the bottom of the tank and in communication with the elbow extremity 27 of a conduit 28 whose opposite extremity 29 is in communication with the compartment 10 of the tank, a valve 30 being arranged in the conduit 28 for controlling the passage of liquid.

The hollow shaft 15 is in communication with a number of passages 31 formed in the agitating head 13 and which extend from the lower extremity of the hollow shaft to the periphery of the head which is circular in shape. At the outer extremity of each of these passages the head is provided with a hood 32 which is offset from the periphery of the head, as shown at 33. When the construction is in use the head is rotated in the direction indicated by the curved arrows in Figs. 1 and 2, and the centrifugal force developed draws water into the agitating head through the sleeve 25 and discharges it through passages 34 formed in the head. At the same time partial vacuums are formed at the offsets 33 of the hoods 32 due to the rushing of the water past the larger extremities of the hoods, and this vacuum condition at the outlet of each hood causes the gas with which the hollow shaft 15 is in communication, as heretofore explained, to rush through the passages 31 and pass into the water, thus thoroughly impregnating the water. The oil in the water causes the gas bubbles to be broken up, whereby every particle of gas is brought into intimate contact or relation with the water, thus washing the gas of its impurities. The gas then rises to the top of the tank and passes off through a nozzle 35 into a conduit 36 which may be connected with any suitable gasometer or receptacle for the gas.

The top of the tank is provided with an opening 37 which is normally closed by a screw plug 38. The oil necessary in order to produce the desired emulsification, is introduced through this opening, after which the opening is closed by the plug, whereby the entire structure is made gas tight except where the gas discharge nozzle 35 is located.

I have found by actual demonstration, that in the absence of the oil, the air or other gas when discharged through the medium of the agitator into the water, enters the same in comparatively large bubbles and in this condition passes upwardly through the water and escapes at the top, thus preventing a thorough emulsification whereby each particle of gas is brought into intimate contact with the water for washing purposes. But as soon as the oil is added to the water, this condition immediately changes and the gas bubbles are broken up, with the result that a thorough emulsification is produced, the finely divided gas particles producing a milky appearance as distinguished from the large bubbles appearing in the water prior to the introduction of the oil, thus indicating that the gas is brought into such intimate relation with the water as to thoroughly cleanse the gas of all such impurities as can be removed by the use of water or other liquid. In other words the gas is thoroughly and uniformly diffused through the water.

In practising the process the agitator 12 is rotated through the medium of any suitable power and at relatively high speed, and during such rotation the water will be rapidly circulated in the tank 5, being drawn from the compartment 10 through the conduit 28, into the compartment 9 at the bottom, from which it overflows into the central compartment 11, whence it passes to the compartment 10 and so on. During this operation, the gas is drawn into the water from the conduit 24 through the hollow shaft 15 and discharged through the passages 31 and the hoods 32 into the water by virtue of the partial vacuum produced at the extremities 33 of the hoods during the rotation of the agitator in the direction indicated by the curved arrows in Fig. 2. A small quantity of oil having been added to the water, the gas as it enters the water is broken up whereby all particles are brought into direct contact therewith, as heretofore explained, giving the water a milky appearance due to the complete breaking up of the gas. Hence, it will be understood that the gas washing operation is continuous and entirely automatic, the gas being drawn into the water through the hollow shaft and the agitating head 13, and after being washed rises to the top of the water and passes to the gasometer or other receptacle by way of the nozzle 35 and the conduit 36. Since the column of water moves steadily upward the incoming gas is mingled with a continuously changing supply of water. In this way thorough contact between the gas and water is brought about at all times and the maximum result is obtained, which is much superior in operation and effect to simply forcing the air out into the water and allowing it to rise up through the column to the surface.

Attention is called to the fact that the humidifying feature of this invention is very important, since in many instances the humidification of the gas is fully as important as the washing of it. From what has been explained, it will be understood that the humidifying effect is simultaneous with the washing result, so that the gas after it has been subjected to my process is not only thoroughly cleansed of all impurities which can be removed through the aid of the washing liquid, but the gas is also humidified which enhances its value for many purposes. The advantage of humidified air where it is employed for building ventilation is readily understood. Furthermore, the humidification or moist condition of the explosive mixture which enters the cylinders of combustion engines is known to give an important advantage, and results in economy in a very marked degree.

This process is also applicable to the flotation method of mineral separation in which thorough diffusion of the gas through the liquid is necessary. In this case the upward movement of the liquid with the bubbles tends to prevent the bubbles from coalescing and also maintains the relative arrangement of the bubbles and tends to keep a given bubble in the vicinity of a given quantity of liquid whereby the values therein may have ample opportunity for attraction to the bubble.

Having thus described my invention, what I claim is:

1. The method of diffusing a gas through a column of liquid which comprises imparting uniform upward movement to the entire column by introducing the liquid at the bottom of the column by centrifugal force and removing it from the top, and diffusing gas into the liquid in the lower portion of the column by means of a partial vacuum produced by continuously displacing the liquid along the path of its centrifugal introduction.

2. The method of diffusing a gas through a column of liquid which comprises imparting upward movement to the entire column by mechanical introduction of the liquid at the bottom of the column by centrifugal force and removal of the liquid from the top of the column, and introducing gas into the lower portion of the column separately from the liquid, the gas being introduced by means of a partial vacuum produced by displacement of the liquid along the path of introduction of the liquid.

3. The method of diffusing gas through a column of liquid which comprises imparting upward movement to the column by introducing the liquid at the bottom of the column and removing it from the top, the removed liquid being passed downwardly and caused to form a downwardly moving column, the columns being maintained separate and distinct throughout the greater portion of their lengths, and having a positive line of demarcation therebetween maintaining substantially the same liquid level in the two columns, the liquid thus being removed from the upwardly moving column into the downwardly moving column below the liquid level, and introducing gas into the lower portion of the upwardly moving column.

4. The method of diffusing a gas through a liquid which comprises providing two columns of the liquid, the columns being maintained separate and distinct throughout the greater portion of their lengths, maintaining the same level in both columns, the surfaces in the two columns merging into each other, imparting upward movement to one column by introducing the liquid at the bottom thereof and removing it from the top thereof into the other column below said liquid level, said other column having a downward movement imparted thereto conducting the liquid from the descending column to the lower portion of the ascending column, and introducing gas into the lower portion of said upwardly moving column at a point separate from the point of introduction of liquid thereinto.

5. The method of diffusing gas through a column of liquid of substantially uniform horizontal cross section which comprises imparting uniform upward movement to the column by introducing the liquid at the bottom of the column and removing it from the top, the removed liquid being passed downwardly and caused to form a downwardly moving column, the columns being maintained separate and distinct with a positive division between them throughout the greater portion of their lengths, maintaining substantially the same liquid level in the two columns, the liquid thus being removed from the upwardly moving column into the downwardly moving column below the liquid level, the path of the upwardly moving column being substantially unobstructed, conducting the liquid from the descending column to the lower portion of the ascending column, and introducing gas into the lower portion of the upwardly moving column.

6. The method of diffusing a gas through a liquid which comprises providing two columns of the liquid, the columns being maintained separate and distinct with a positive division between them throughout the greater portion of their lengths, maintaining the same level in both columns, the surfaces in the two columns merging into each other, imparting uniform upward movement to one column by introducing the liquid at the bottom thereof and removing it from the top thereof into the other column below said liquid level, said other column having a downward movement imparted thereto, conducting the liquid from the descending column to the lower portion of the ascending column, and introducing gas into the lower portion of said upwardly moving column separately from the liquid, the upwardly moving column having substantially uniform horizontal cross sectional area, and its path being substantially unobstructed.

7. The method of diffusing a gas through a liquid which comprises providing two columns of the liquid, maintaining the columns separate and distinct throughout the greater portion of their lengths with a positive division therebetween, maintaining the same level in both columns, their surfaces merging into each other, imparting upward movement to one column by introducing the liquid at the bottom thereof and removing it from the top thereof into the other column below said liquid level, said other column having a downward movement imparted thereto, conducting the liquid from the descending column to the lower portion of the ascending column, the liquid being introduced into the bottom of the ascending column by centrifugal force, and diffusing gas into the lower portion of the ascending column by means of a partial vacuum formed by continuously displacing the liquid along the path of its centrifugal introduction, the gas thereby being introduced separately from the liquid.

8. The method of diffusing a gas through a liquid which comprises providing two columns of the liquid, maintaining the columns separate and distinct throughout the greater portion of their lengths with a positive division therebetween, maintaining the same level in both columns, their surfaces merging into each other, imparting uniform upward movement to one column by introducing the liquid at the bottom thereof and removing it from the top thereof into the other column below said liquid level, said other column having a downward movement imparted thereto conducting the liquid from the descending column to the lower portion of the ascending column, the liquid being introduced into the lower portion of the ascending column by centrifugal force, and diffusing a gas into the lower portion of the ascending column separately from the introduction of the liquid by means of a partial vacuum formed by continuously displacing the liquid along the path of its centrifugal introduction, the ascending column having substantially uniform horizontal cross sectional area, and its path being substantially unobstructed.

In testimony whereof I affix my signature.

JOSEPH P. RUTH, JR.